March 25, 1947.                 J. I. FATUR                 2,417,918
                          HOUSEHOLD UTILITY TRUCK
                            Filed Dec. 18, 1945
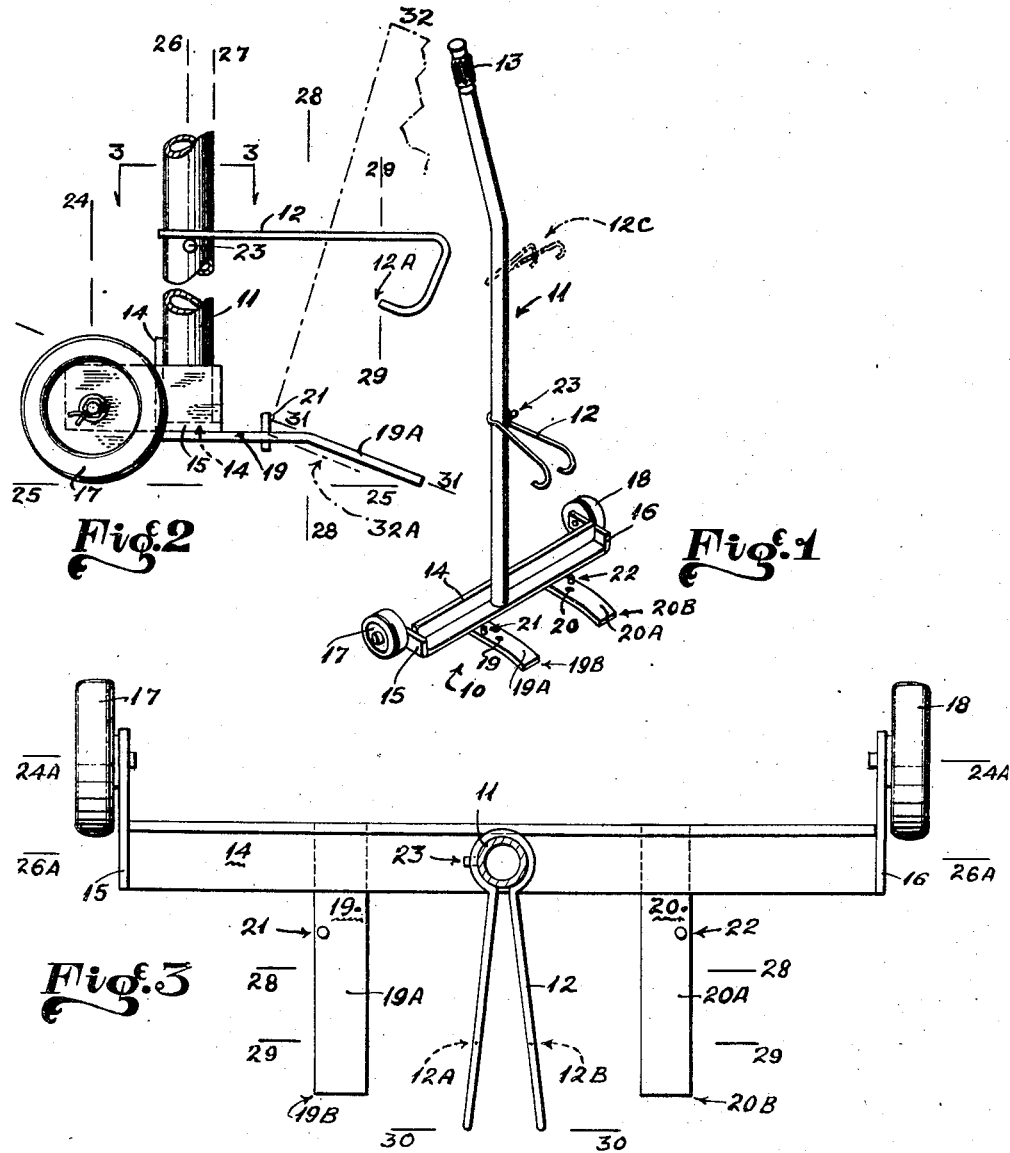
INVENTOR
JAMES I. FATUR
BY
          Nicholas Pippen
              AGENT Patented Mar. 25, 1947

2,417,918

UNITED STATES PATENT OFFICE 2,417,918

HOUSEHOLD UTILITY TRUCK

James I. Fatur, Culver City, Calif.

Application December 18, 1945, Serial No. 635,839

5 Claims. (Cl. 214—65.4)

My invention relates to two-wheel, single-stem hand trucks, particularly to small light ones suitable for use in households for the moving of garbage pails and other objects of moderate weight and size, and referred to consequently as household utility trucks.

A primary object and advantage is the unusually low manufacturing cost, deriving from extreme simplicity of design and structure.

Another object and advantage is an arrangement of the constituent parts, respecting particularly the center of gravity of average-dimensioned objects supported by the truck, whereby the supported object tends to tilt forwardly and away from the stem or shank of the truck instead of leaning backwardly against it and tending as a consequence to roll off the base of the truck laterally therefrom.

An additional object and advantage is adjustability to a considerable variety of supported objects, respecting both size and form, whether they be boxes or pails or otherwise and whether with or without internal or external flanges or other projections at the open top ends or elsewhere thereof.

There are many different embodiments of the instant invention which will suggest themselves to persons skilled in the art. From among them, I have selected only one, because of its simplicity and typicalness, as a suitable subject of this specification and the accompanying drawing, in which—

Figure 1 is a perspective view of said embodiment or truck.

Figure 2 is a fragmentary side elevation view thereof.

Figure 3 is a plan view of the base thereof as seen in the plane 3—3 in Figure 2.

The truck mainly consists of the object-supporting base 10, the attenuated, thereto immovably fixed single stem 11, secured conceivably by an annular fillet weld if the stem be of circular cross-section, and the stem-embracing detent 12, the base-distal end of the stem being provided with the rubber grip 13 for more convenient grasping thereof. The function of the detent 12 is to hold the supported object against either forward or afterward tilting.

Base 10 consists of the attenuated, horizontally extending, main cross member or traverse 14, consisting, in this embodiment, of an angle. To it, at the two opposite ends thereof, immovably fixed, conceivably by welding, are the two cross-sectionally upright plate brackets 15 and 16, respectively mounting the two wheels 17 and 18 on clevis-pin-type axles, screwed or otherwise fitted into the brackets.

Immovably fixed to the traverse, conceivably by welding, are the two mutually spaced prongs 19 and 20, respectively provided with studs or detents 21 and 22, which are for abutment thereagainst by the stem-confronting bottom margin of a pail or otherwise.

Detent 12 is slidable longitudinally of the stem, which is provided with a stud or detent-controlling means 23 for preventing undue baseward sliding of the detent. The absence of such a restraining element would force the user to stoop to raise the base-overlying detent 12 before sliding the truck toward the object to engage it underneath thereof by the two prongs. When handling low objects, the detent 12 may be disposed at an appropriately low height, which may be of course even below the detent or stud 23. The stem-confronting ends of the detent are primarily for engaging, in the case of a pail, the large single wire bail, when the pail is so provided, that extends upwardly therefrom, hingedly secured to the sides. The relationship between detent 12 and the studs 23 is such that, regardless of the position of the supported object, there are always three main points of contact between the object and the truck. The twin-shank nature of the detent is not functionally essential. It may be single-shank in design. However, the dual-hook-end nature of the detent 12 is functionally essential as it contributively restrains all tendency of the supported object to roll off the truck laterally therefrom and locks the supported object, when it being held by the open top end thereof, against forward and afterward tilting or dislodgment. The dot-and-dash-line representation of detent 12, namely, 12C—see Figure 1, indicates the position of the detent when engaging certain tall objects, necessitating an upwardly tilted aspect of the detent.

The two wheels are axially alined, the thereto common wheel axis and wheel plane being respectively indicated by 24A—24A and 24.

The two base-distal portions of the prongs are indicated by 19A and 20A, each said portion having a length in excess of one-half of the total length of the prong, which is presumed to be that of the projecting part of the prong and to not include the anchored part thereof underneath the traverse. The two outermost ends of the prongs, 19B and 20B, together with the two lines of support provided by the two wheels, define the surface plane 25—25 of a flat supporting surface for the stationary said truck. In this state, the base-adjoining portion of the stem is in the vertical mean stem plane 26. The vertical plane of the front of the base-adjoining portion of the stem is indicated by 27. Stem plane 26, in this particular embodiment, contains the longitudinal axis 26A of the traverse. Plane 26 is identical therefore with the longitudinal mean plane of the traverse. If the horizontal leg of the angle constituting the traverse were to be made longer, the coincidence of the stem plane and the traverse plane would change to adjacency if the stem should continue, as is desirable, to be welded to the vertical as well as to the horizontal leg of the traverse. Each of the prong portions 19A and 20A lies in the plane 31—31, oblique to the surface plane 25—25.

The critical plane 28 defines the base-proximal loci in the two prongs that terminally define said base-distal prong portions, which are of course oppositely terminally defined by said outermost ends, 19B and 20B.

The detent 12 terminates in two terminal parts, which, in their concave aspect, confront the stem. The respective two object-contacting loci in said two terminal parts are indicated by 12A and 12B, together defining the detent plane 29—29. The ultimate base-distal plane of the structure is indicated by 30—30. The dot-and-dash representation 12C of the detent indicated the detent in an elevated position, upwardly forwardly extending to hold a tall object.

By disposing said base-distal prong portions in a plane oblique to the surface plane, an object, such as that indicated by 32 in dot-and-dash lines, is permitted to tilt forwardly, thereby disposing its center of gravity well in advance of plane 27, the liberal length of the detent 12 permitting the object so to do. This relationship, together with the unusual position of the base in advance of the two supporting wheels, permits the supported object to remain tilted forwardly notwithstanding a considerable backwardly tilted attitude on the part of the stem, to suit the convenience of the operator of the truck. In object 32, the part indicated by 32A represents a longitudinal or axially parallel bottom flange of a garbage pail or the like.

The described distinctive relationship of parts accords the truck greater flexibility in the application thereof. It is adapted, with equal facility, to the moving of boxes, pails with or without handles, bails or otherwise and of any type, and otherwise. If desired, each prong may, in its entirety, be disposed in a plane oblique to the surface plane instead of only a portion thereof, as described.

All plane references in this description and the accompanying claims, other than to the surface plane, are to planes that parallel the wheel plane and are normal to the surface plane.

I claim:
1. A utility truck comprising an object-supporting base, an attenuated thereto immovably fixed stem, whose base-adjoining portion defines the stem plane, and a stem-engaging detent for preventing dislodgement of said object, said base including: two axially alined supporting wheels, whose common axis is in the wheel plane; two mutually spaced prongs, whose two respective outermost ends, together with said wheels, are adapted to support the stationary said truck on a flat surface defining the surface plane; an attenuated traverse, whose longitudinal mean traverse plane parallels the wheel axis; two cross-sectionally upright plate brackets, angular to the wheel plane and immovably fixed to said traverse respectively at the two opposite ends thereof, all of the traverse being between the wheel plane and the prongs; said detent being slidable longitudinally of the stem and having dual hook ends which, in their concave aspect, confront the stem and are adapted to engage the flanged open end of a pail or a bail thereon, the object-contacting loci in said hook ends defining the detent plane.

2. A truck as in claim 1 and provided with detent-controlling means for preventing the detent from undue baseward sliding.

3. A truck as in claim 1, each of said prongs being provided with an upright, stem-adjacent stud for abutment thereagainst by the bottom-adjoining portion of the upright wall of an object.

4. A truck as in claim 1, at least the stem-distal portion of each prong having a length of at least one-half the length of the prong and being in a mean plane oblique to said supporting plane.

5. A truck as in claim 1, at least the stem-distal portion of each prong having a length of at least one-half the length of the prong and being in a mean plane oblique to said supporting plane, the stem-proximal loci in the prongs, which loci terminally define said prong portions, being in a critical plane between and appreciably spaced from the stem plane and the detent plane.

JAMES I. FATUR.

REFERENCES CITED

The following references are of record in the file of this patent:

UNITED STATES PATENTS

| Number | Name | Date |
|---|---|---|
| 1,438,334 | Sabin | Dec. 12, 1922 |
| 1,470,526 | Cade | Oct. 9, 1923 |
| 483,006 | Nichless | Sept. 20, 1892 |
| 1,517,951 | Cade | Dec. 2, 1924 |